United States Patent [19]

Arsenault

[11] Patent Number: 4,925,900
[45] Date of Patent: May 15, 1990

[54] HALOGENATED-HYDROGENATED ACRYLONITRILE-BUTADIENE RUBBER

[75] Inventor: Gilles J. Arsenault, Courtright, Canada

[73] Assignee: Polysar Limited, Sarnia, Canada

[21] Appl. No.: 245,323

[22] Filed: Sep. 16, 1988

[51] Int. Cl.$^5$ .............................. C08F 8/04; C08F 8/22
[52] U.S. Cl. .................... 525/329.3; 525/338; 525/356
[58] Field of Search ........................ 525/329.3

[56] References Cited

U.S. PATENT DOCUMENTS

| | | | |
|---|---|---|---|
| 2,581,927 | 1/1952 | Briant | 525/329.3 |
| 3,700,637 | 10/1972 | Finch, Jr. | 525/329.3 |
| 3,932,370 | 1/1976 | Landi et al. | 525/329.3 |
| 4,384,081 | 5/1983 | Kubo et al. | |
| 4,452,950 | 6/1984 | Wideman | 525/329.3 |
| 4,503,196 | 3/1985 | Rempel et al. | |
| 4,581,417 | 4/1986 | Buding et al. | |
| 4,647,627 | 3/1987 | Buding et al. | 525/329.3 |
| 4,656,219 | 4/1987 | Oyama et al. | 525/329.3 |
| 4,746,707 | 5/1988 | Fielder et al. | 525/329.3 |
| 4,795,788 | 1/1989 | Himmler et al. | 525/329.3 |
| 4,816,525 | 3/1989 | Rempel et al. | 525/329.3 |

*Primary Examiner*—Bernard Lipman
*Attorney, Agent, or Firm*—Stevens, Davis, Miller & Mosher

[57] ABSTRACT

The present invention relates to adducts of a partially hydrogenated acrylonigrile-butadiene rubber and a halogen selected from chlorine and bromine. The preferred adducts are characterized by having a surprisingly low gel content of less than ten weight percent, as measured by weight percent insoluble in methyl ethyl ketone after sixteen hours at 30° C.

8 Claims, No Drawings

HALOGENATED-HYDROGENATED ACRYLONITRILE-BUTADIENE RUBBER

FIELD OF THE INVENTION

The present invention relates to adducts of a partially hydrogenated acrylonitrile-butadiene rubber and a halogen selected from chlorine and bromine.

BACKGROUND OF THE INVENTION

Acrylonitrile-butadiene rubber, also referred to herein as NBR, is an established article of commerce which is prepared by the copolymerization of acrylonitrile with butadiene and, optionally, a minor amount of isoprene.

The hydrogenation of acrylonitrile-butadiene rubber is well know. Processes to hydrogenate NBR are described in U.S. Pat. Nos. 4,384,081, 4,581,417, and 4,503,196, the disclosures of which are incorporated herein by reference. Partially hydrogenated acrylonitrile-butadiene rubber typically exhibits improved resistance to heat aging in comparison to unsaturated acrylonitrile-butadiene rubber.

Processes to halogenate polymers are also known. However, the reaction of a halogen with rubber frequently results in the formation of an adduct having a high fraction of insoluble material (i.e., "gel"). Although gelled polymers are useful in certain applications, particularly in adhesives, gel is normally considered undesirable because it causes difficulty in compounding and mixing processes. Furthermore, attempts to vulcanize gelled rubber normally provide vulcanizates with poor tensile strength and elongation at break properties.

I have discovered useful adducts of a partially hydrogenated NBR and a halogen selected from bromine and chlorine. Preferred adducts of the present invention are characterized by having a surprisingly low gel level of less than 10%, as measured by weight % insoluble after 16 hours in methyl ethyl ketone (MEK) at 30° C.

It is an object of the present invention to provide an adduct of a partially hydrogenated acrylonitrile-butadiene rubber and a halogen selected from bromine and chlorine.

It is another object of the present invention to provide a process to prepare an adduct of a halogen and a partially hydrogenated acrylonitrile-butadiene rubber.

It is a further object of the present invention to provide a vulcanizate prepared by curing a low gel adduct of a halogen and a partially hydrogenated acrylonitrile-butadiene rubber.

SUMMARY OF THE INVENTION

In one embodiment of the invention there is provided an adduct of a partially hydrogenated acrylonitrile-butadiene rubber and a halogen selected from bromine and chlorine, wherein the adduct is characterized by having residual carbon-carbon double bond unsaturation of less than 10 mole %.

In a preferred embodiment of the invention there is provided an adduct of a partially hydrogenated acrylonitrile-butadiene rubber and a halogen selected from bromine and chlorine, wherein the adduct is characterized by having (i) a gel content of less than 10% as measured by weight per cent insoluble in methyl ethyl ketone after 16 hours at 30° C. and (ii) residual carbon-carbon double bond unsaturation of less than 10 mole %.

In another embodiment of the present invention, there is provided a process to prepare an adduct of bromine and a partially hydrogenated acrylonitrile-butadiene rubber, wherein said adduct is characterized by having residual carbon-carbon double bond unsaturation of less than 10 mole per cent, said process consisting of (a) providing a solution consisting of from 0.5 to 15 weight per cent of partially hydrogenated acrylonitrile-butadiene rubber having from 0.5 to 10.0 mole per cent residual carbon-carbon double bond unsaturation in a gel inhibiting polar solvent (b) adding from 0.5 to 15 parts by weight of a halogen selected from bromine and chlorine per 100 parts by weight of said rubber to said solution, with stirring.

DETAILED DESCRIPTION OF THE INVENTION

Acrylonitrile-butadiene rubber may be prepared by the well known free radical emulsion polymerization process and contains from 18 to 50 (especially from 28 to 40) weight per cent bound acrylonitrile units, with the balance being either bound butadiene units, or a combination of bound butadiene units with a minor amount of bound isoprene units.

NBR contains carbon-carbon double bond unsaturation and carbon-nitrogen triple bond unsaturation. The partially hydrogenated NBR which is employed in the present invention is selectively hydrogenated, such that the carbon-carbon double bonds are preferentially saturated. The selective hydrogenation of NBR is well know and is described, for example, in U.S. Patent 4,503,196, U.S. Patent 4,581,417, and U.S. Patent 4,384,081. The process used to prepare partially hydrogenated acrylonitrile-butadiene rubber is not critical to the success of the present invention.

Partially hydrogenated NBR may be characterized by the amount of residual carbon-carbon double bond unsaturation. The partially hydrogenated NBR which is employed in the present invention is preferably selectively hydrogenated to the extent that it contains from 10 to 0.1 mole per cent residual carbon-carbon double bond unsaturation.

Preferred adducts of the present invention have a gel content of less than 10 weight per cent.

While not wishing to be bound by any theories, my experimentation shows that three difference factors can influence the gel content of the adduct:

(i) The solvent system in which the halogenation is completed:

(ii) The unsaturation level of the partially hydrogenated NBR prior to halogenation; and (iii) The type and amount of halogen which is utilized.

A discussion of each of these factors is provided below.

Under certain conditions, the solvent in which the halogenation reaction is completed may affect the gel content of the adduct. Through extensive experimentation, I have discovered that the use of a "polar solvent" helps to inhibit the formation of the gel in the present inventive adducts.

As used herein, the term gel inhibiting polar solvent refers to a liquid which satisfies two requirements:

(i) It is solvent for the partially hydrogenated NBR;

(ii) It contains a "polar" component (i.e. one which exhibits a dipole moment) which inhibits gel formation in the adduct.

Examples of suitable polar solvents include: simple polar solvents including ketones such as methyl ethyl ketone (MEK) and acetone; amides such as dimethyl formamide and dimethylacetamide; methylene chloride; and acetonitrile; combinations of a non polar solvent (such as suitable aliphatic and aromatic hydrocarbons) with a minor amount of at least one of the above mentioned polar solvents, and combinations of a non-polar solvent with a minor amount of a polar additive which is miscible with the solvent such as methanol, ethanol, propanol, isopropanol, butanol and isobutanol.

Preferred polar solvent systems include acetone; methyl ethyl ketone; and a mixture of chlorobenzene with a minor amount (5 to 30 wt %) of methanol or ethanol.

It will be apparent that a wide variety of solvent systems may be employed to prepare the preferred, low gel adducts of the present invention.

The ability of a particular polar solvent system to suppress gel formation may be quickly established with small-scale experiments. In such experiments, a solution of about 5 grams of partially hydrogenated NBR in 100 grams of the solvent is stirred while a molar equivalent of chlorine or bromine (based on carbon-carbon unsaturation) is added to the solution, over a time period of from about 30 seconds to 2 minutes. The halogenated adduct is then recovered from the solvent system by any conventional technique such as, alcohol or steam coagulation.

A qualitative test may be then completed by simply placing the adduct in MEK at room temperature. Non-gelled adduct will readily dissolve, while grossly gelled adduct will not dissolve. Thus, qualitative judgements regarding gel content can be quickly made by visual observation. Highly preferred adducts contain essentially no gel, and solvent systems which may be used to produce such adducts can be quickly identified by the above visual test.

A quantitative expression for gel content is given by the following formula:

$$\text{weight \% gel} = \frac{\text{weight of adduct insoluble}}{\text{total weight of adduct}} \times 100\%$$

The amount of residual unsaturation contained in the partially hydrogenated NBR, prior to halogenation, can also influence the gel level of the resulting adduct. The partially hydrogenated NBR which is employed to prepare the adducts of the present invention preferably has a residual unsaturation level of from 10 to 0.1 mole per cent. It is highly preferred to employ a partially hydrogenated NBR having an unsaturation level of less than 5 mole per cent because, for reason which are not completely understood, such rubber generally has a lesser tendency to produce a gelled adduct.

The adducts of the present invention are prepared by reacting a halogen selected from chlorine and bromine with a partially hydrogenated NBR, in solution.

It is preferred to use molecular halogen as the halogen source. It is highly preferred to use a total molar amount of molecular halogen which is less than the molar amount of residual carbon-carbon double bond unsaturation in the partially hydrogenated NBR.

After halogenation, it is preferred to treat the solution with a base and/or epoxidized soya bean oil, in order to neutralize any remaining halogen or halogen-derived acid. An antioxidant, such as a hindered phenolic compound, may also be suitably added. The adduct is then recovered from the solution by any conventional technique, such as steam coagulation or alcohol coagulation.

While not wishing to be bound by any theories, it is believed that the halogen is incorporated into the partially hydrogenated NBR via an addition reaction through the residual carbon-carbon double bond unsaturation of the butadiene units, as illustrated below:

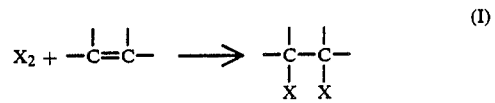

where X is Br or Cl.

The above halogenation reaction preferably does not consume all of the carbon-carbon double bonds which were originally contained in the partially hydrogenated NBR. Preferred adducts of the present invention contain from 0.5 to 10 weight per cent halogen and from 0.1 to 4.0 mole per cent residual carbon-carbon double bond unsaturation.

Furthermore, analytical data indicate that certain components of the solvent system may be incorporated into the adducts of the present invention particularly when a low molecular weight alcohol is used in the solvent system. Halogenated adducts which contain a minor proportion of incorporated solvent are also encompassed by the present invention.

As previously noted, NBR may also contain a minor proportion of bound isoprene units. NBR containing bound isoprene units may be hydrogenated such that the resulting partially hydrogenated NBR contains residual unsaturated isoprene units. While not wishing to be bound by any theories, it is believed that chlorine may be incorporated into isoprene-containing partially hydrogenated NBR via a substitution reaction, as illustrated below:

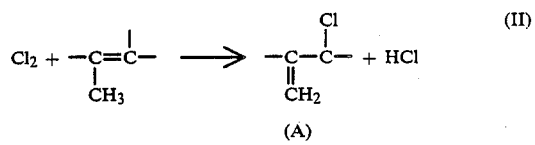

The postulated structure (A) above contains exomethylene unsaturation and an allylic chlorine atom. The exomethylene unsaturation may be identified via an infra red absorption peak at between 905 and 915 cm$^{-1}$.

The present invention is further illustrated by the following non-limiting examples, in which all parts and percentages are by weight unless otherwise indicated.

EXAMPLE 1 (comparative)

This example illustrates the preparation of an adduct having a gel content of greater than 10%.

A partially hydrogenated acrylonitrile-butadiene rubber was prepared using a base polymer having an acrylonitrile content of about 38% and a Mooney viscosity (ML 1+4 at 100° C.) of about 50. The selective hydrogenation was completed according to a process described in U.S. Pat. No. 4,503,196, using H Rh (PPH$_3$)$_4$ as a homogeneous catalyst to hydrogenate NBR in a monochlorobenzene solution. The resulting partially hydrogenated rubber was recovered from the solution and dried. It was then analyzed by infra-red spectroscopy and found to be approximately 93% hydrogenated.

A solution of the partially hydrogenated NBR was then prepared by re-dissolving 6 grams of the rubber in about 100 g of monochlorobenzene. The solution was transferred to a round bottom flask and set on a rotary mixer.

In a separate container, a dilute solute of bromine was prepared by adding 5 ml of bromine to 20 ml of monochlorobenzene.

A molar equivalent of bromine (based on the residual carbon-carbon unsaturation in the rubber) was then added to the rubber solution, over a time period of 1-2 minutes.

The resulting brominated adduct of partially hydrogenated acrylonitrile butadiene rubber was recovered from the solution and dried under vacuum. The adduct did not dissolve is methyl ethyl ketone, indicating that it was grossly gelled.

EXAMPLE 2

This example illustrates the preparation of brominated adduct of partially hydrogenated acrylonitrile-butadiene rubber having less than 10 weight % gel.

10 g of a partially hydrogenated acrylonitrile rubber having 93% of the carbon-carbon double bonds hydrogenated was dissolved in a polar solvent comprising 204 ml of monochlorobenzene, 24 g of ethanol and 12 g of water.

6 ml of bromine, dissolved in 20 ml of monochlorobenzene, was added to the rubber solution. The characteristic red color of the bromine rapidly disappeared.

The solution was then coagulated with excess methanol, and the rubber was separated and dried under vacuum.

The gel content of the brominated adduct was measured as follows:

A two gram quantity of the adduct was placed in a small bottle, together with 100 ml of methyl ethyl ketone. The bottle was placed in a constant temperature bath at 30° C. and shaken for 16 hours.

The bottle was then removed from the bath and immediately filtered through a 325 mesh stainless steel filter.

The solution was then dried in a vacuum oven at 100° C. to constant weight.

Solubility is given by the expression:

$$\% \text{ Solubility} = \frac{\text{weight dried polymer}}{\text{weight of original polymer}} \times 100\%$$

Gel is defined as the insoluble portion (or gel = 100% = % Solubility).

EXAMPLE 3.

This example illustrates the preparation of inventive brominated adducts of partially hydrogenated acrylonitrile-butadiene rubber.

In Experiment 1, a base acrylonitrile-butadiene rubber having a bound acrylonitrile content of about 38% was selectively hydrogenated such that approximately 93% of the carbon-carbon double bonds were hydrogenated. A rubber solution containing 300 g of this partially hydrogenated NBR in 3000 g of monochlorobenzene was then prepared in a six liter flask.

In a separate container, a solution of 700 g of monochlorobenzene and 1000 g of ethanol was prepared. The ethanol containing solution was then slowly added to the rubber solution.

15 ml of bromine, diluted with 25 ml of monochlorobenzene, was then added to the rubber solution. The characteristic red colour of the bromine rapidly disappeared.

A small sample (about 20 ml) of the solution was withdrawn and the adduct recovered from it. Subsequent infra-red analysis of the adduct showed that over 99% of the carbon-carbon double bonds were saturated.

An additional aliquot of bromine (5 ml of bromine diluted with 20 ml of monochlorobenzene) was added to the flask, about 25 minutes after the initial quantity of bromine was added.

86 mg of a hindered phenol antioxidant (sold under the tradename Irganox 1010 by Ciba Geigy Limited) was then added to the solution, followed by 100 ml of 6% aqueous NaOH. Finally, 5.6 g of epoxidized soya bean oil (sold under the tradename Paraplex G-62) was added to the solution.

The solution was mixed for about 1 hour after which time the brominated adduct was recovered by steam coagulation and dried.

Infra red analysis of sample of the brominated adduct showed that about 99.7% of the carbon-carbon double bonds were saturated.

Elemental analysis indicated that the adduct contained about 10.6% bromine.

The brominated adduct was measured for gel content according to the procedure described in Example 2 and found to contain about 3.2% gel.

The procedure generally described above was generally repeated for experiments 2, 3 and 4 with the minor procedural changes notes below.

In experiment 3, a single aliquot of bromine (containing 3 ml bromine in 20 ml of chlorobenzene) was used to brominate the rubber solution. The resulting brominated adduct solution was treated with 66 mg of hindered phenol antioxidant, 100 ml of 6 % NaOH and 4.3 g of epoxidized soya bean oil.

In experiment 2, only a single aliquot of bromine (6 ml bromine in 20 ml of monochlorobenzene) was used. After bromination, the solution was treated with 66 mg of hindered phenol antioxidant, 4.8 g of epoxidized soya beam oil and 100 ml of 6% aqueous NaOH.

Experiment 4 utilized a partially hydrogenated NBR having a higher degree of hydrogenation (97% of the carbon-carbon double bonds were hydrogenated) but a similar bound acrylonitrile content (38%), in comparison to the partially hydrogenated NBR of Experiment 1. 300 g of this partially hydrogenated NBR was dissolved in a polar solvent comprising 3700 g of chlorobenzene and 1000 g ethanol, as described in Experiment 1. The resulting solution was brominated with 6 ml of bromine diluted in 20 ml of chlorobenzene. The brominated solution was treated with 64 mg of hindered phenol antioxidant, 100 ml of 6% aqueous NaOH and 4.7 g of epoxidized soya bean oil.

Analytical results are compiled in Table 1.

TABLE 1

| Experiment | Gel content of Adduct (wt %) | Bromine content of Adduct (wt %) |
|---|---|---|
| 1 | 3.2 | 10.6 |
| 2 | 2.4 | 4.2 |
| 3 | 6.0 | 2.2 |
| 4 | 7.9 | 3.2 |

EXAMPLE 4

This example illustrates the preparation of brominated adducts of partially hydrogenated NBR, using different types of solvents as the reaction medium.

The partially hydrogenated NBR used in all experiments of this example was prepared with an NBR having a bound acrylonitrile content of about 38% and a Mooney viscosity (ML 1 +4 at 100°) of about 50 and was selectively hydrogenated such that approximately 97% of the carbon-carbon double bonds were saturated.

In experiment 31, a rubber solution was prepared by dissolving 6 g of the partially hydrogenated nitrile rubber in a solvent system consisting of 115g monochlorobenzene and 29 g of butryaldehyde (butanal).

The rubber solution was placed in a flask equipped with a mechanical stirrer. Bromine (0.1 ml, diluted with 5 ml of MCB) was added dropwise to the rubber solution over a period of about 20 seconds.

10 ml of 10% NaOH was then added to the solution. The rubber was recovered and analyzed according to the procedure described in Example 2.

Experiments 32–36 were completed using the procedure of experiment 31, except that the 29 g of butryaldehyde was replaced with 29 g of different polar additive (as shown in table 2). In experiment 37, the solvent employed was 144 g of acetone. The gel content of the adducts prepared in this example is described in Table 2. The adducts described in table 2 are characterized by having a low gel content.

TABLE 2

| Experiment | Polar Additive | Gel content of Adduct-wt % |
|---|---|---|
| 31 | butryaldehyde | 3.9 |
| 32 | tetra-hydro furan | 2.2 |
| 33 | dimethyl formamide | 1.4 |
| 34 | acetone | 1.8 |
| 35 | ethanol | 2.6 |
| 36 | methylene chloride | 2.4 |
| 37 | acetone$^a$ | 0.9 |

$^a$: acetone was the only solvent

EXAMPLE 5

This example illustrates the preparation of chlorinated adducts of partially hydrogenated NBR.

The partially hydrogenated NBR used in all experiments of this example was prepared with an NBR having a bound acrylonitrile content of about 38% and a Mooney viscosity (ML 1 +4 at 100° C.) of about 50.

The partially hydrogenated NBR used in experiments 50 and 51 was selectively hydrogenated such that approximately 93% of the double bonds were saturated. The partially hydrogenated NBR used in experiments 52–54 was selectively hydrogenated such that approximately 97% of the carbon-carbon double bonds were hydrogenated.

Chlorine solutions were employed for the chlorination reactions. The chlorine solutions were prepared by bubbling chlorine gas through carbon tetrachloride until a solution containing approximately 0.32 g chlorine per ml was obtained. In example 50, 10 g of partially hydrogenated NBR (93% saturated) was added to a solvent consisting of 126 g of monochlorobenzene and 31 g of ethanol. A solution of chlorine in carbon tetrachloride (32 ml, containing 0.32 g chlorine per ml) was then added dropwise. The rubber solution gelled after only about 10 ml of the chlorine solution was added, and a gelled rubber separated from the solution. No characterization of the gelled product was completed.

Experiment 51 was completed using this procedure described for experiment 50, except that a solvent system consisting of about 190 g of monochlorobenzene and 50 g of ethanol was employed. After only about 14 ml of the chlorine solution was added, a gelled mass separated from the rubber solution.

Experiment 52 was completed using a partially hydrogenated NBR having a higher level of hydrogenation (97% of the carbon-carbon double bonds were saturated). The solvent utilized this experiment consisted of 190 g of monochlorobenzene and 50 g of ethanol. 10 g of rubber was used to prepare the rubber solution. 32 ml of a solution of chlorine in carbon tetrachloride (0.32g chlorine/ml) was added to the rubber solution over a period of about 20 seconds. Mixing was continued for a further 30 minutes, with no visible gel formation. 10 ml of 10% aqueous NaOH was then added, followed by alcohol coagulation. The recovered adduct was analyzed for gel content according to the procedure described in Example 3 and found to contain about 8.3% gel.

Experiments 53 and 54 were completed using the procedure described for experiment 52 except that the 50 g was ethanol was replaced with 50 g of methanol in experiment 53 and 50 g of acetonitrile in experiment 54. The chlorinated adducts produced in experiments 53 and 54 also have low gel levels, as shown in Table 3.

TABLE 3

| Experiment | Polar Additive | Gel content of Adduct (%) |
|---|---|---|
| 52 | ethanol | 8.3 |
| 53 | methanol | 3.6 |
| 54 | acetonitrile | 4.3 |

EXAMPLE 6

This example illustrates the preparation of a vulcanizate using a low gel brominated adduct of the present invention.

100 parts by weight of a brominated adduct of acrylonitrile-butadiene rubber (having about 2.2 weight per cent bromine, about 6.0 weight per cent gel and about 5.5 mole per cent carbon-carbon double bond unsaturation) was mixed on a cold mill with 50 parts by weight carbon black, 1.5 parts by weight sulphur, 0.3 parts by weight tetramethylthruiam disulphide and 1.5 parts by weight benzothiazyl disulphide until the compound visually appeared to be homogeneous (about 4–5 minutes).

The compound was removed from the mill and sheeted. About 10 grams of the sheeted compound was then placed into an Oscillating Disk Curemeter which was operated at a temperature of 166° C. with a rotational amplitude of 3 degrees (according to ASTM D 2084). The torque versus time curve which was generated by the curemeter had a maximum torque of approximately 100 dN.m at a time of about twenty-two minutes and a generally constant torque value at cure times from twenty two to thirty minutes (a phenomenon referred to by those skilled in the art as an "equilibrium torque"). The above torque results from the Curemeter test indicate the formation of a vulcanizate.

EXAMPLE 7

This example illustrates the preparation of halogenated adducts of a partially hydrogenated, isoprene-containing NBR.

The base polymer was produced by a conventional, free radical emulsion polymerization of a monomer mixture consisting of 38 parts by weight acrylonitrile, 10 parts by weight isoprene and 52 parts by weight butadiene. The resulting polymer was recovered from the latex and dried to provide a solid rubber.

A solution containing about 6 parts by weight of the rubber in monochlorobenzene was then partially hydrogenated in the presence of HRh (PPh$_3$)$_4$ catalyst. The partially hydrogenated rubber was recovered from solution by alcohol coagulation and dried. Spectral analysis of the recovered partially hydrogenated rubber by n.m.r. showed that it contained a resonance signal attributed to isoprene unsaturation (a 5–5.2 ppm shift, against a tetramethylsilane reference standard).

The preparation of brominated and chlorinated adducts of this partially hydrogenated, isoprene-containing NBR is illustrated by experiments 71 and 72 below.

In experiment 71, a rubber solution was prepared which contained 5 grams of the rubber in a solvent system consisting of 135 grams of monochlorobenzene and 25 grams of methanol. This rubber solution was brominated with 0.22 ml of bromine, dissolved in 10 ml of monochlorobenzene. A small quantity of the brominated adduct was recovered and analyzed by infra-red spectroscopy. The infra-red spectrum showed a reduction in the olefinic peak at about 970 cm$^{-1}$, but did not show any peak in the region from 900–915 cm$^{-1}$. A further amount of bromine (0.01 ml bromine in 5 ml of monochlorobenzene) was then added to the rubber solution.

The brominated adduct was then recovered by methanol coagulation. Subsequent infra-red analysis showed that the olefinic peak at 970 cm$^{-1}$ was essentially eliminated, but did not show a peak in the 900–915 cm$^{-1}$ region. It may be concluded from these results that the bromine may be incorporated in the simple addition reaction described as formula (I).

In experiment 72, a rubber solution was prepared which contained about 5 grams of partially hydrogenated isoprene containing NBR in a solvent system consisting of 135 grams of monochlorobenzene and 25 grams of methanol. This rubber solution was initially treated with 10.2 mls of a chlorine in carbon tetrachloride solution (containing 0.32 grams chlorine per ml solution).

A small quantity of the chlorinated adduct was recovered and analyzed by infra-red spectroscopy. The infra-red spectrum still showed an olefinic peak at about 970 cm$^{-1}$ but also showed a new peak at about 910 cm$^{-1}$. The new peak was attributed to exomethylene unsaturation.

The rubber solution was then treated with a further 7.2 mls of chlorine-in-carbon tetrachloride solution (containing 0.32 grams chlorine/ml). After 15 minutes, the solution was coagulated with methanol and the adduct recovered and dried. Subsequent infra-red analysis of the chlorinated adduct showed that the peak at 970 cm$^{-1}$ was essentially eliminated, and that a very prominent peak at about 910 cm$^{-1}$ was formed.

In summary, this example surprisingly illustrates that chlorinated adducts of isoprene-containing NBR may have the exomethylene unsaturation referred to in formula (II) of this disclosure, and that there is no evidence of the formation of exomethylene unsaturation during bromination.

What is claimed is:

1. An adduct of a partially hydrogenated acrylonitrile-butadiene rubber and a halogen selected from bromine and chlorine wherein the adduct is characterized by having
   (i) a gel content of less than 10% as measured by weight per cent insoluble in methyl ethyl ketone after 16 hours at 30° C. and
   (ii) residual carbon-carbon double bond unsaturation of less than 10 mole per cent.

2. The adduct of claim 1 wherein said partially hydrogenated acrylonitrile-butadiene rubber contains from 28 to 40 weight per cent bound acrylonitrile units.

3. The adduct of claim 1 which contains from 0.5 to 10.0 weight per cent halogen and from 0.1 to 4.0 mole per cent residual carbon-carbon double bond unsaturation.

4. The adduct of claim 3 which contains from 0.5 to 5.0 weight per cent bromine and from 0.1 to 2.0 mole per cent residual carbon-carbon double bond unsaturation.

5. An adduct of a partially hydrogenated, isoprene-containing acrylonitrile-butadiene rubber and a halogen selected from bromine and chlorine, wherein the adduct is characterized by having residual carbon-carbon double bond unsaturation of less than 10 mole per cent.

6. The adduct of claim 5 which contains from 0.5 to 10.0 weight per cent halogen and from 0.1 to 4.0 mole per cent residual carbon-carbon bond unsaturation.

7. The adduct of claim 5 wherein said halogen is chlorine.

8. The adduct of claim 7 which is characterized by having exomethylene unsaturation, as indicated by the presence of an infra-red absorption peak in the region from 905 to 915 cm$^{-1}$.

* * * * *